United States Patent [19]

Kashio

[11] Patent Number: 5,283,895
[45] Date of Patent: Feb. 1, 1994

[54] APPARATUS AND METHOD FOR PROCESSING DATA CORRESPONDING TO WORD LABELS

[75] Inventor: Toshio Kashio, Tokyo, Japan

[73] Assignee: Casio Computer Co., Ltd., Tokyo, Japan

[21] Appl. No.: 891,678

[22] Filed: May 28, 1992

Related U.S. Application Data

[63] Continuation of Ser. No. 360,236, Jun. 1, 1989, abandoned.

[30] Foreign Application Priority Data

| Jul. 14, 1988 | [JP] | Japan | 63-175411 |
| Jul. 14, 1988 | [JP] | Japan | 63-175413 |
| Jul. 14, 1988 | [JP] | Japan | 63-175414 |

[51] Int. Cl.⁵ .................... G06F 15/40; G06F 15/403
[52] U.S. Cl. ........................... 395/600; 364/918.1; 364/962.1; 364/943; 364/959.3; 364/974; 364/DIG. 2
[58] Field of Search ............... 395/600, 700; 364/401, 364/402, 405, 406, 200 MS File, 900 MS File

[56] References Cited

U.S. PATENT DOCUMENTS

| 3,822,378 | 7/1974 | Kashio . | |
| 4,003,031 | 1/1977 | Kashio . | |
| 4,031,515 | 6/1977 | Kashio . | |
| 4,032,900 | 6/1977 | Kashio . | |
| 4,034,350 | 7/1977 | Kashio . | |
| 4,064,553 | 12/1977 | Kashio . | |
| 4,079,234 | 3/1978 | Kashio . | |
| 4,103,334 | 7/1978 | Kashio . | |
| 4,133,041 | 1/1979 | Kashio . | |
| 4,145,753 | 3/1979 | Kashio . | |
| 4,360,872 | 11/1982 | Suzuki et al. | 364/900 X |
| 4,851,999 | 7/1989 | Moriyama | 364/401 |
| 4,852,000 | 7/1989 | Webb et al. | 364/900 X |
| 4,910,676 | 3/1990 | Alldredge | 364/900 X |
| 4,918,593 | 4/1990 | Huber | 364/200 |
| 5,079,695 | 1/1992 | Dysart et al. | 395/700 |
| 5,097,408 | 3/1992 | Huber | 395/600 |
| 5,131,090 | 7/1992 | Fukushima | 395/700 |

FOREIGN PATENT DOCUMENTS

| 0213276A2 | 3/1987 | European Pat. Off. . |
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |

OTHER PUBLICATIONS

IBM Technical Disclosure Bulletin, vol. 31, No. 1, Jun. 1988, pp. 158-159, New York, US; "Differential index management with low priority batch updating in database management systems".

Proceedings of the 1987 Fall Joint Computer Conference: 'Exploring Technology: Today and Tomorrow', Dallas, Texas, Oct. 25-29, 1987, pp. 452-460, IEEE, New York, US; N. Roussopoulos: "Overview of ADMS: A high performance database management system".

Quattro Pro User's Guide, Borland International, Spreadsheet Links, 1987, pp. 299-308.

Primary Examiner—Gareth D. Shaw
Assistant Examiner—Dennis M. Butler
Attorney, Agent, or Firm—Frishauf, Holtz, Goodman & Woodward

[57] ABSTRACT

A data processing apparatus comprises input, file update, display and print processing units which are independently operated and linked to each other. Arbitrary word labels can independently be set in each processing unit. Each processing unit performs only an operation defined by the word labels. The data processed by one processing unit can be used as a source data based on which the succeeding linked processing unit performs another processing operation.

7 Claims, 18 Drawing Sheets

FIG. 3A

TABLE A FORMAT

| FILE NAME | |
|---|---|
| TOTALIZATION CONDITION | |
| WORD LABEL | |
| | |
| | |
| | |
| | |
| | |
| | |

FIG. 3B

EXAMPLE OF TABLE A

| FILE NAME | / |
|---|---|
| TOTALIZATION CONDITION | / |
| WORD LABEL | |
| DATE | |
| SLIP NUMBER | |
| CLIENT CODE | |
| ITEM CODE | |
| QUANTITY | |
| UNIT PRICE | |
| AMOUNT | |

FIG. 3C

EXAMPLE OF TABLE A

| FILE NAME | SALES F |
|---|---|
| TOTALIZATION CONDITION | UPPER SEVEN DIGITS |
| WORD LABEL | |
| DATE | |
| AMOUNT | |
| | |
| | |
| | |
| | |

EXAMPLE OF TABLE C

| FILE NAME | SALES F |
|---|---|
| UPDATE TYPE | ADDITION |

| | WORD LABEL | | |
|---|---|---|---|
| K | ITEM CODE | | |
| | DATE | | |
| D | QUANTITY | | |
| | AMOUNT | | |

FIG. 4B

TABLE C FORMAT

| FILE NAME | |
|---|---|
| UPDATE TYPE | |

| | WORD LABEL | | |
|---|---|---|---|
| K | AREA OF KEYWORD | | |
| D | AREA OF UPDATE WORD | | |

FIG. 4A

EXAMPLE OF TABLE C

| FILE NAME | TOTAL F | |
|---|---|---|
| UPDATE TYPE | ADDITION | |
| WORD LABEL | | |
| K | DATE | |
| D | AMOUNT | |

FIG. 4D

EXAMPLE OF TABLE C

| FILE NAME | CLIENT F | |
|---|---|---|
| UPDATE TYPE | TOTALIZATION | |
| WORD LABEL | | |
| K | CLIENT CODE | |
|   | ITEM CODE | |
| D | QUANTITY | |
|   | AMOUNT | |

FIG. 4C

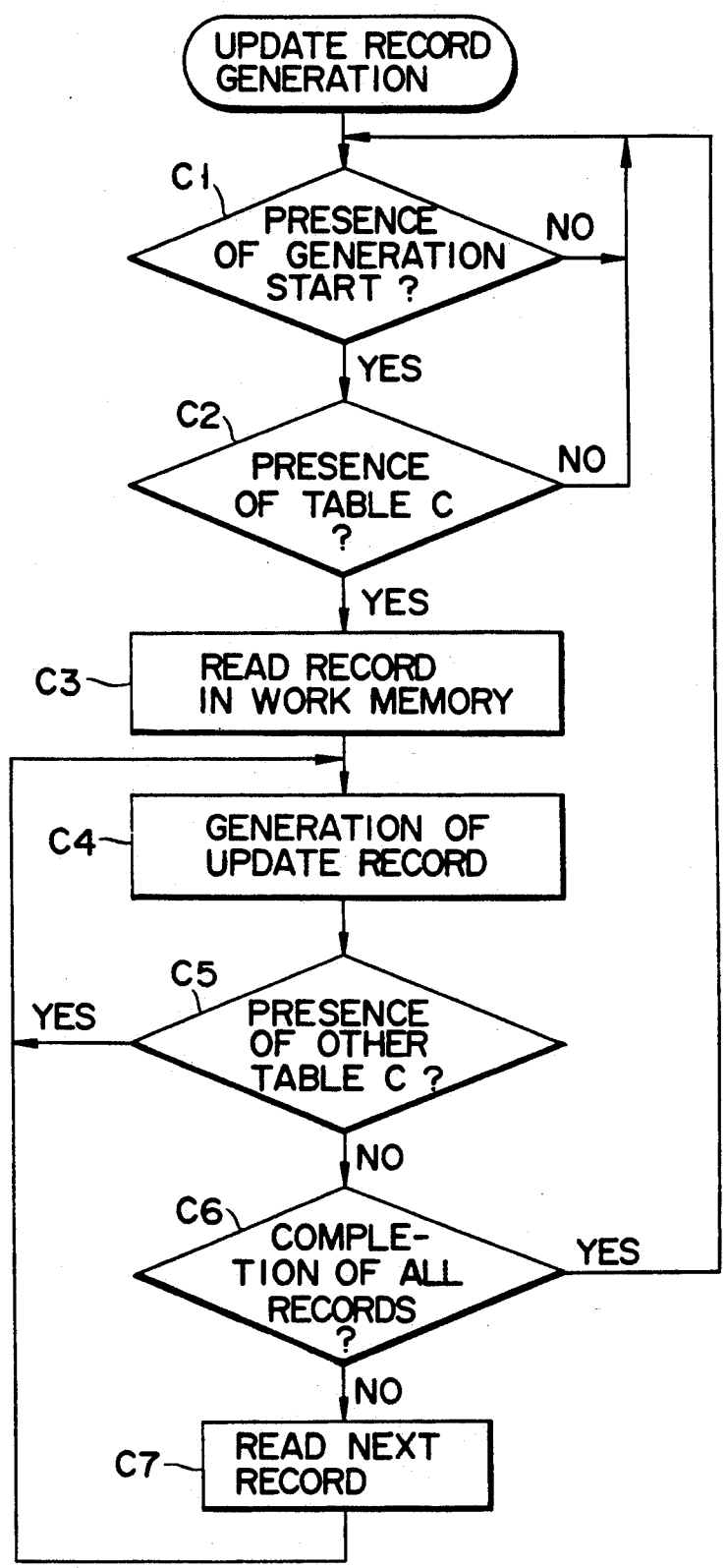
F I G. 6

|   | DATE | SLIP NO. | CLIENT CODE |
|---|---|---|---|
| D1 |  |  |  |

|   | ITEM CODE | QUANTITY | UNIT PRICE | AMOUNT |
|---|---|---|---|---|
| D2 |  |  |  |  |
|  |  |  |  |  |
|  |  |  |  |  |
|  |  |  |  |  |

FIG. 10

RECORD GENERATED IN WORK MEMORY 26 WORD LABEL [WORD DATA]

| DATE [870907] |
|---|
| SLIP NUMBER [011] |
| CLIENT CODE [50] |
| ITEM CODE [010] |
| QUANTITY [3] |
| UNIT PRICE [1000] |
| AMOUNT [3000] |

FIG. 11

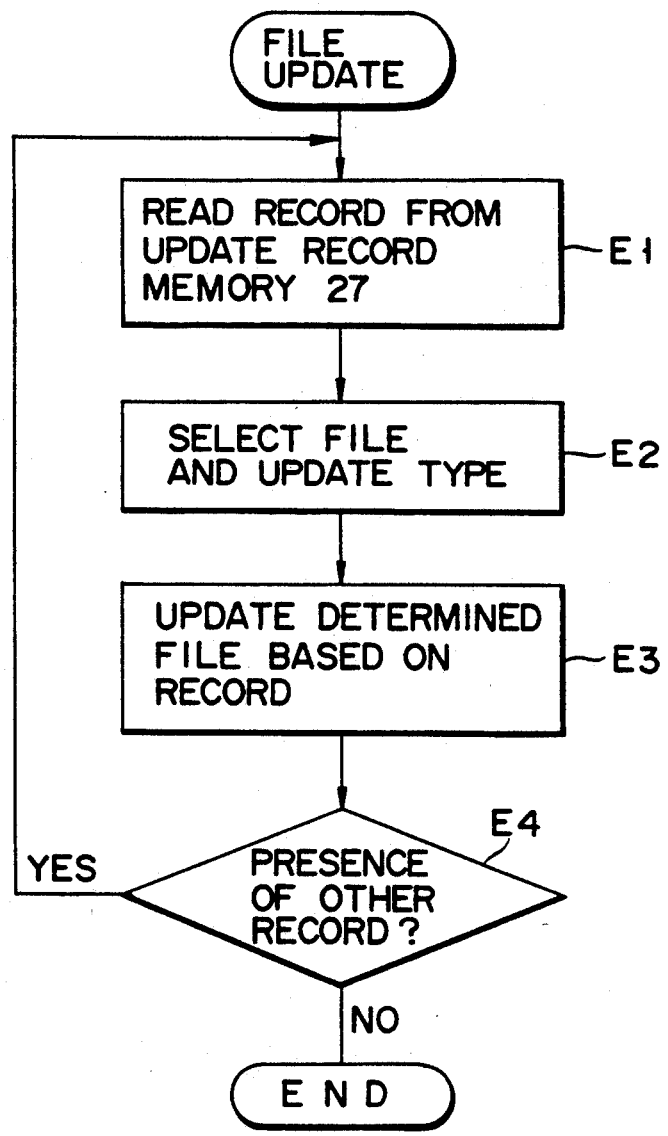
F I G. 14

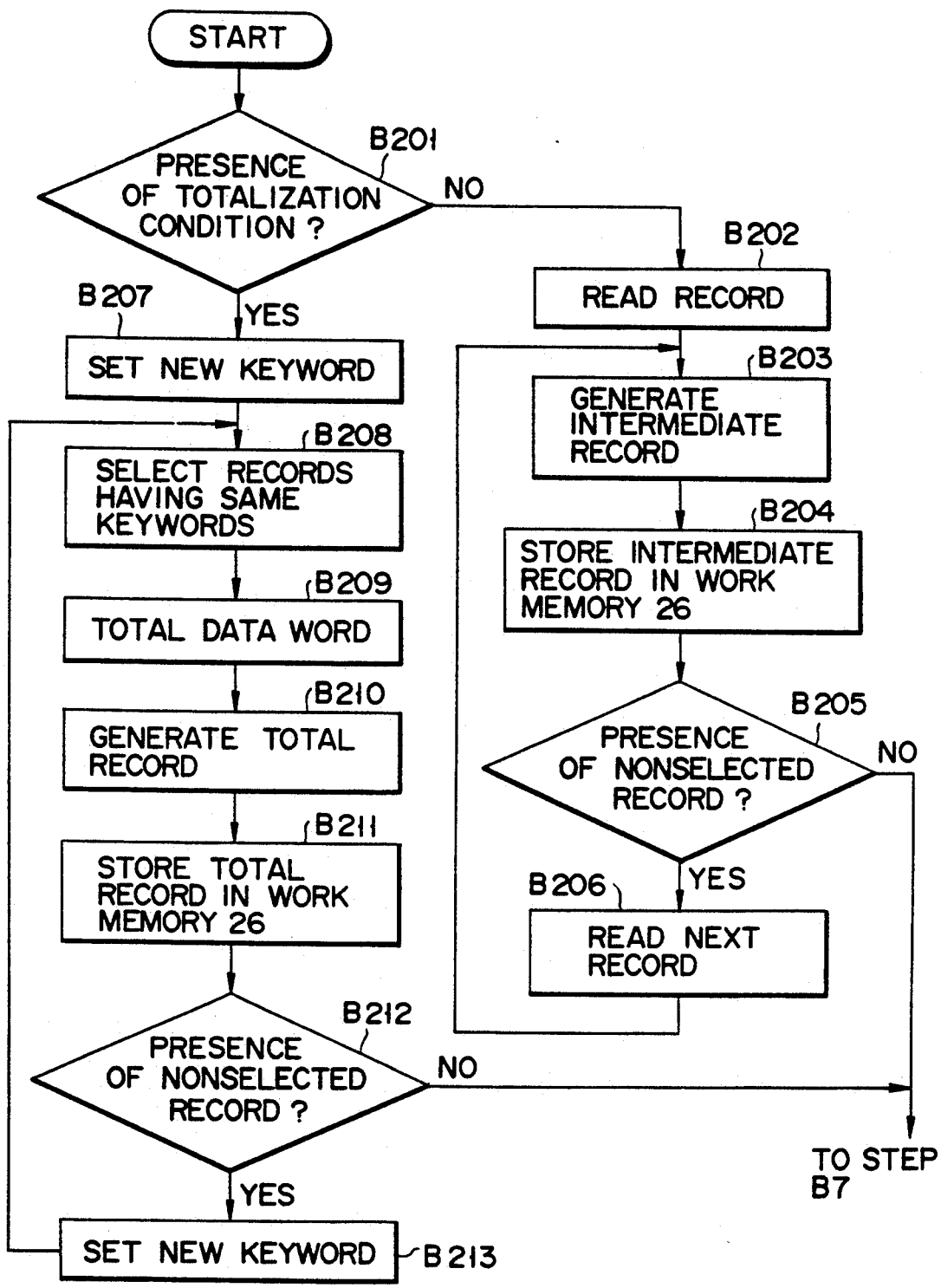
F I G. 16

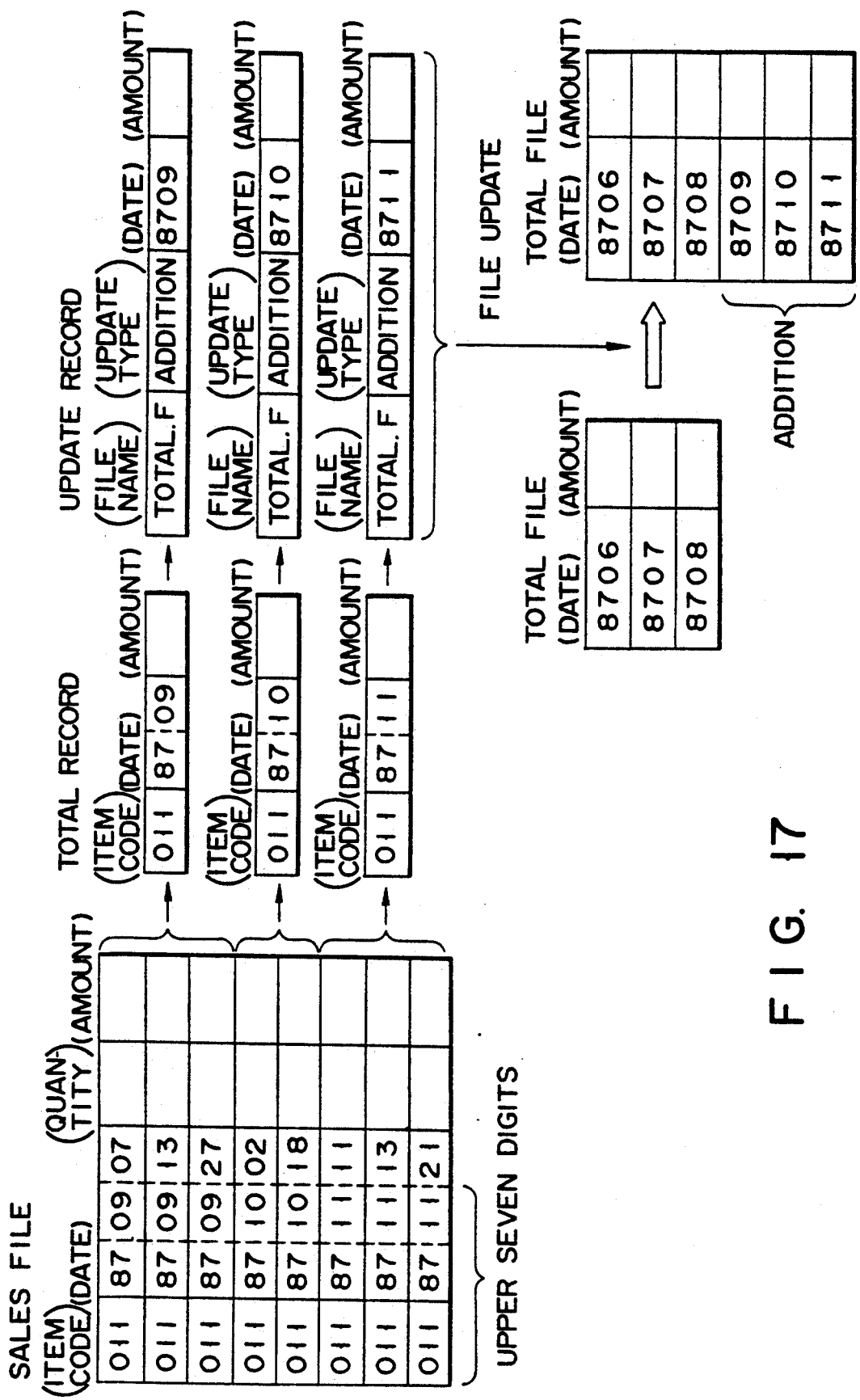
F I G. 17

APPARATUS AND METHOD FOR PROCESSING DATA CORRESPONDING TO WORD LABELS

This application is a continuation of application Ser. No. 07/360,236, filed Jun. 1, 1989, now abandoned.

BACKGROUND OF THE INVENTION

1. Field of the Invention

The present invention relates to a data processing apparatus for performing different types of data processings, in accordance with input data or data read out from arbitrary files.

2. Description of the Related Art

Companies often have a variety of lines of business. Moreover, different companies have different lines of businesses even if the industrial sectors of the companies are the same. Further a given company may have a different line of business depending on its office. Accordingly, different types of data must be handled in each office. In order to process and manage such varieties of data at high speed, each company makes use of office automation equipment and a computer for its business applications.

Usually, a specific system design is required for a computer to operate as a company desires. The system design is performed by coding a program by a programming language such as a machine language to operate the computer desirably. Thus, in order to operate the computer desirably, a system engineer must analyze the line of business and business requirements, and a programmer must code a program in accordance with the result of such analysis.

Each computer uses a large number of types of business slips, including, for example, order-acceptance slips, sales slips, purchase slips, and transfer slips of traveling-expense statement of accounts, credit slips, and the like. Throughout the following description, such slips, forms, records, etc are referred to as "slips" for ease of description.

Since various tasks must be carried out in a company, the above system design must be performed for every task, i.e., for every processing type. Accordingly, such system design is troublesome and costly.

SUMMARY OF THE INVENTION

An object of the present invention is to provide an apparatus and method for processing data corresponding to word labels which can eliminate the need to conduct a system design analysis accompanying a programming which requires an expert knowledge, thereby simplifying a system design corresponding to a user's requirements.

In order to achieve the above object, an apparatus of the present invention is provided for carrying out different types of data processing in accordance with input data, comprising: storing and specifying means (14, 16, 17, 18) for storing a plurality of input word labels, a plurality of file word labels, and a plurality of output word labels data which correspond to the respective slip processing types, and for specifying input word labels, the file word labels, and the output word labels which correspond to a selected one of the processing types; an input unit (11, 20, 26) for inputting word data corresponding to the respective input word labels, specified by said storing and specifying means; a file processing unit (21, 28), coupled to said input means (20), for extracting, from the input word data, data corresponding to respective file word labels specified by said storing and specifying means and for preparing an update record data which include data corresponding to the extracted first word data, and for updating the record in a file in accordance with the prepared update record data; and an output processing unit (22, 30, or 23, 31), coupled to said input means, for extracting, from the input word data, second word data corresponding to respective output word labels specified by said storing and specifying means, and for outputting the extracted second word data to an output unit.

According to the present invention, an entire system is constituted by linking a plurality of independent processing units. Therefore, each processing unit can be set to handle various types of data independently. A plurality of word labels to be set in each of the processing units can arbitrarily be determined in correspondence to a processing content. Thus, even if the processing content differs depending on the tasks, the data processing can be performed only by changing the word labels to be set in the respective processing units, thereby simplifying the system designing operation.

BRIEF DESCRIPTION OF THE DRAWINGS

FIGS. 3A through 3C are views showing a data setting format and data setting examples of table A;

FIGS. 4A through 4D are views showing a data setting format and data setting examples of table C;

FIG. 6 is a flowchart showing a processing performed by unit 21;

FIG. 10 is a view for explaining a display format;

FIG. 11 is a view showing a record in work memory 26;

FIG. 14 is a flowchart showing a processing performed by unit 28;

FIG. 16 is a flowchart showing a detail of FIG. 5; and

FIG. 17 is a view for explaining a file-update status of an intermediate record.

DETAILED DESCRIPTION OF THE PREFERRED EMBODIMENT

Figure 1A:
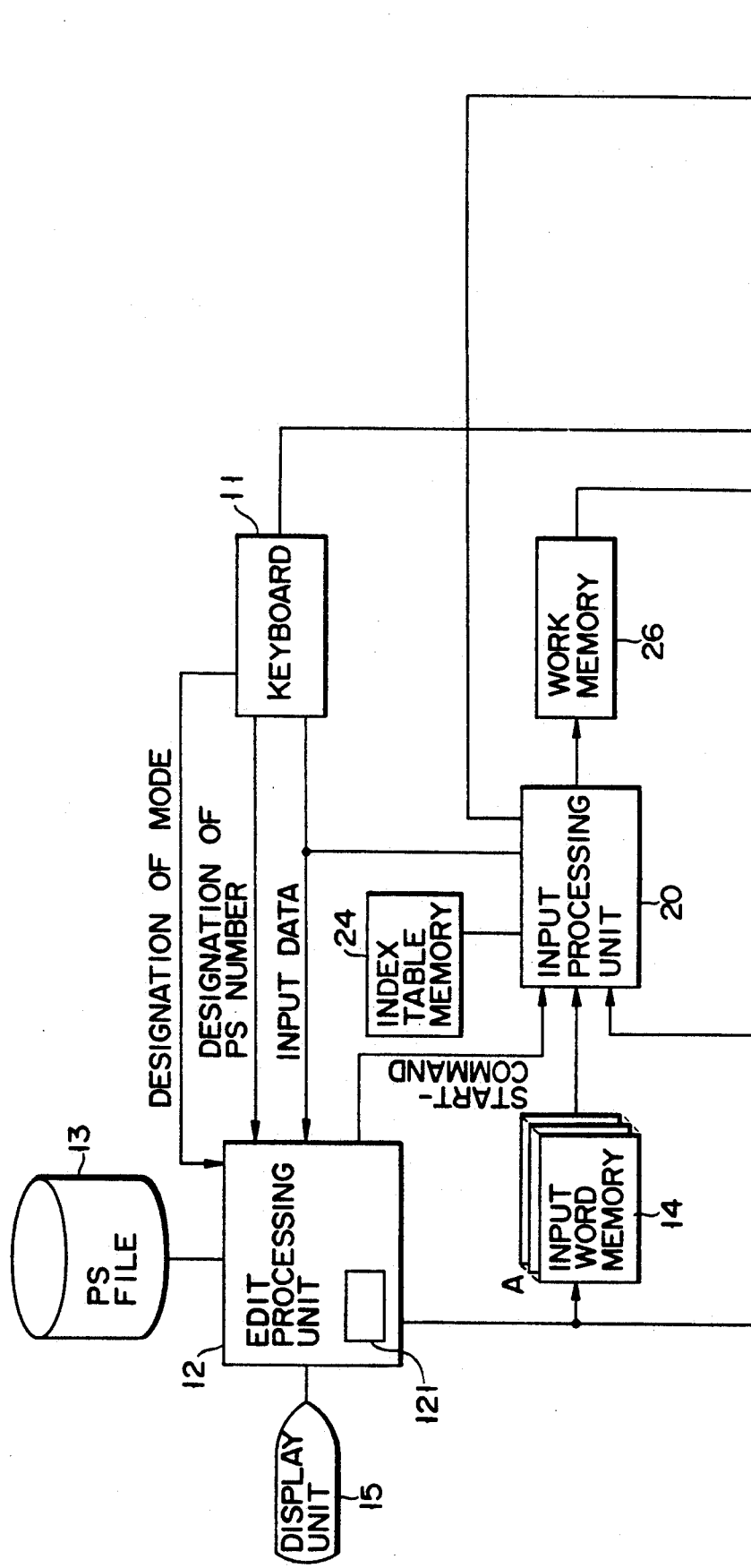
FIGS. 1A and 1B show a block diagram for explaining an embodiment of the present invention.
Figure 1B:
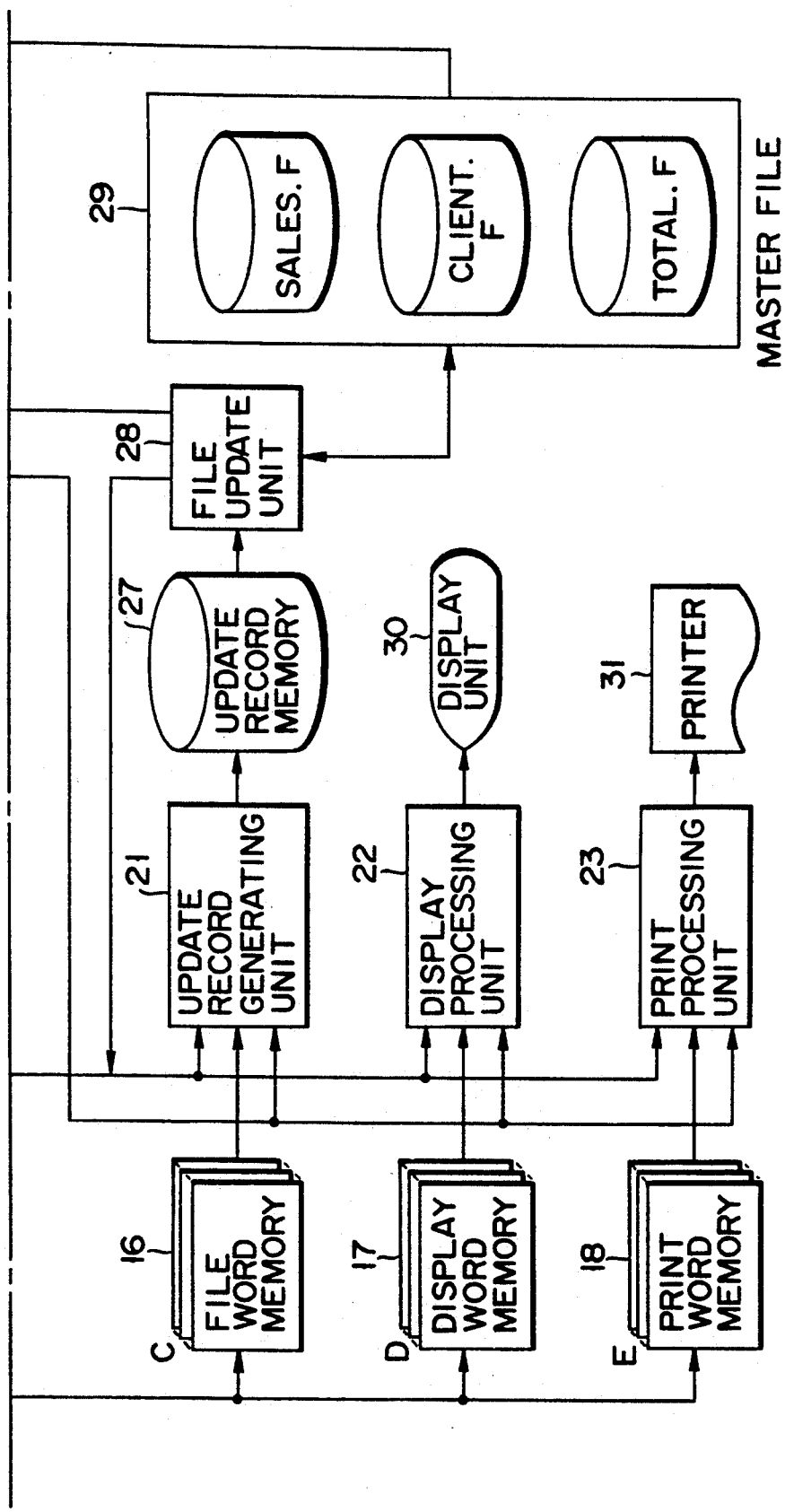

FIGS. 1A and 1B show a block diagram of a data processing apparatus according to the present invention. In FIGS. 1A and 1B, keyboard 11 is provided with various input keys, designation keys for designating slip processing tasks, totalization processing tasks, and the like, mode designation keys, and the like. Input data and designation data input from keyboard 11 are supplied to edit processing unit 12. Edit processing unit 12 is connected to PS file 13 and display unit 15. PS file 13 preliminarily stores, according to various processing tasks, word labels (hereinafter referred to as table A) for defining input words, word labels (hereinafter referred to as table C) for defining processing functions with respect to update record generating unit 21, definition data (hereinafter referred to as table D) for defining display words and a display format, and word labels (hereinafter referred to as table E) for defining print words and printing format. The displaying format may be the same as the printing format. Tables A through E are generally referred to as a PS. PS file 13 stores the PS according to processing tasks, in correspondence to arbitrary PS numbers.

In response to designations from keyboard 11, edit processing unit 12 sets tables A, C, D and E by each of processing-task read-out tables A, C, D and E corresponding to one of processing task from PS file 13, and loads tables A, C, D and E in input word memory 14, file word memory 16, display word memory 17, and print word memory 18, respectively. Thereafter, unit 12 gives a start command to input processing unit 20. Table A loaded in input word memory 14, table C loaded in file word memory 16, table D loaded in display word memory 17, and table E loaded in print word memory 18 are coupled to input processing unit 20, update record generating unit 21, display processing unit 22, and print processing unit 23, respectively.

Input processing unit 20 is connected to keyboard 11, master file 29, index table memory 24, and work memory 26. Index table memory 24 preliminarily stores current date data, slip number data which are automatically updated in response to an issuance of a slip, and item name data and unit price data both of which correspond to item codes, respectively. Input processing unit 20 performs, in accordance with stored table A, processing operations with respect to data from keyboard 11 or data from master file 29. Unit 20 stores word data obtained by the above operations in work memory 26, and supplies a start command to update record generating unit 21 and print processing unit 23.

Update record generating unit 21 is connected to update record memory 27. Update record generating unit 21 starts a processing operation in response to the start command from input processing unit 20, reads word data from work memory 26, in accordance with file word labels stored in file word memory 16, generates an update record comprised of the word data, and stores it in update record memory 27. The update record includes a file name code of a file to be updated, a file updata type code keyword data and update word data each having a same word arrangment as that of a record in the file.

Update record memory 27 stores a plurality of update records. Each of the update records in memory 27 is supplied to file update unit 28 in response to a command from keyboard 11. File update unit 28 updates files in master file 29, corresponding to the update record.

Display processing unit 22 reads word data from work memory 26 in accordance with display word labels stored in display word memory 17, and displays the word data on display unit 30. Print processing unit 23 starts a printing operation in response to the start command from input processing unit 20, reads word data from work memory 26 in accordance with print word labels stored in print word memory 18, and prints out the word data by driving print unit 31.

The processing performed by edit processing unit 12, input processing unit 20, update record generating unit 21, and print processing unit 23 will now be described with reference to the drawings.

Figure 2:
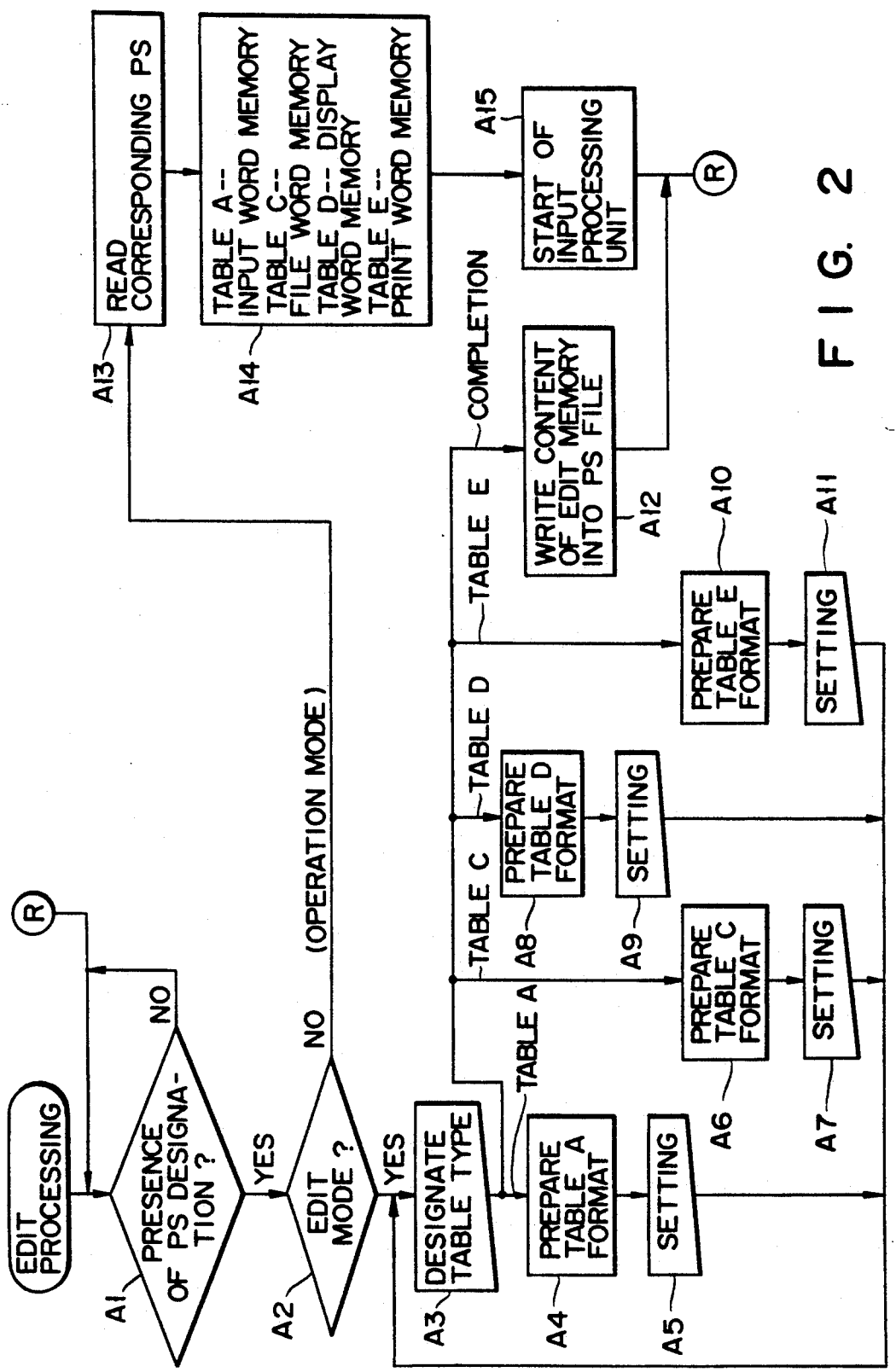
FIG. 2 is a flowchart indicating a processing performed by unit 12.

When the PS corresponding to a desired processing task is set in PS file 13, an edit mode is designated through keyboard 11. Thereafter, an arbitrary PS number is designated through keyboard 11. The designation data of edit mode and PS number is supplied from unit 11 to unit 12. Thus, edit processing unit 12 performs an operation shown in a flowchart of FIG. 2.

Edit processing unit 12 checks, in step A1, a presence or an absence of the designation of PS number from keyboard 11. If the PS number is designated, unit 12 determines, in step A2, whether the edit mode is designated or not. If the edit mode is designated, unit 12 waits, in step A3, a designation of table types by an operator. In step A3, if the operator designates a type of table A, unit 12 displays, in step A4, table A format shown in FIG. 3A on the display screen of the display unit 15, and in step A5, unit 12 waits an input operation from the operator, in accordance with table A format, data of a file name, totalization condition, and word labels. Each of the input data are stored in edit memory 121. FIGS. 3B and 3C specified examples of table A. In an example shown in FIG. 3B, the file name and the totalization condition are not input, but "date", "slip number", "client code", "item code", "quantity", "unit price", and "amount" are input as the word label. This table A is used for slip processing tasks. In an example shown in FIG. 3C, "sales file" is input as the file name, "upper seven digits of keyword" is input as the totalization condition, and "date", "amount" are input as the word label. Table A shown in FIG. 3C is used for the totalization processing tasks.

When a type of table C is designated in step A3, unit 12 displays, in step A6, table C format shown in FIG. 4A, and in step A7, inputs the file name code, the file, update type code, keyword labels (K) and update word labels (D), in accordance with the table C format, and each of the input data are stored in edit memory 121. FIG. 4B shows an example of table C. As shown in FIG. 4B, "sales file" is set as the file name code, and "addition" is set as the file update type code. Furthermore, "item code" and "date" are set as the keyword labels, and "quantity" and "amount" are set as the update word labels. FIGS. 4C and 4D show other examples.

Further, when a type of table D or table E are designated in step A3, similar operation as described above are performed in steps A8 and A9 or A10 and A11. The table D or table E set data in accordance with the table D format or table E format are stored in edit memory 121.

When setting of tables A through E is completed and an operator depresses a completion key, edit processing unit 12 loads, in step A12, each of the tables stored in edit memory 121 in PS file 13 as the PS corresponding to the designated PS number. Thereafter, unit 12 returns to step A1.

When a desired PS number is designated on the operation mode, unit 12 reads, in step A13, the PS corresponding to the designated PS number from PS file 13, and loads, in step A14, the tables A through E in input word memory 14, file word memory 16, display word memory 17, and print word memory 18. Thereafter, unit 12 gives, in step A15, a start command to input processing unit 20.

Figure 5:
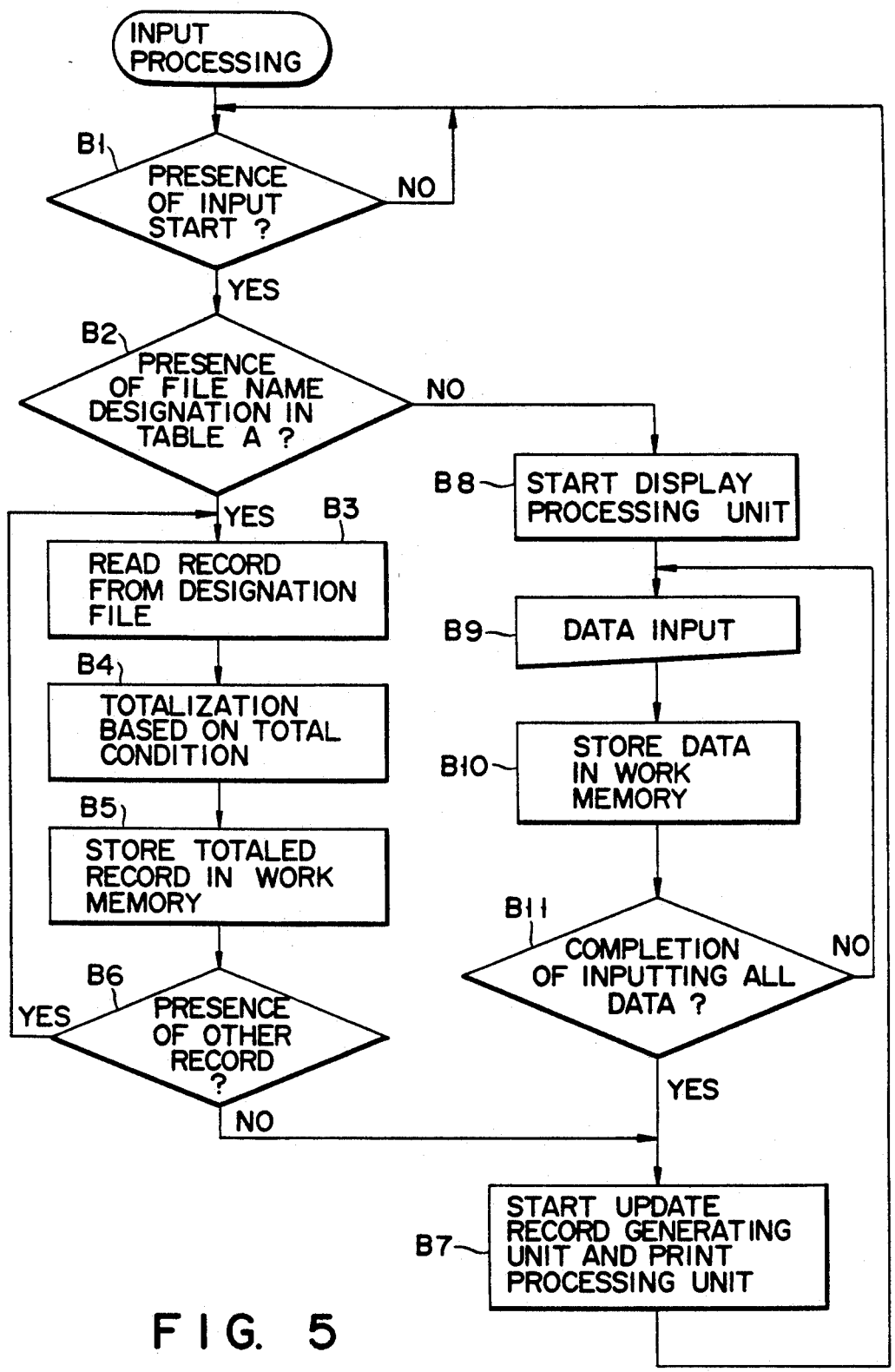
FIG. 5 is a flowchart showing a processing performed by unit 20.

Thus, input processing unit 20 starts, and performs a processing according to a flowchart shown in FIG. 5. In step B1, unit 20 checks for the presence or absence of a start command from edit processing unit 12. If the presence of the start command is determined, unit 20 advances to step B2 to determine whether the file name is set in input word memory 14. If the file name code is set as shown in FIG. 3C, unit 20 reads a record from a specified file corresponding to the file name code, and performs an input processing with respect to the record. More specifically, unit 20 reads, in step B3, one record from the specified file of master file 29, and performs, in step B4, a totalization processing with respect to the record in accordance with the totalization condition. Further, unit 20 stores, in step B5, the totaled record in work memory 26.

Steps B3 through B5 are repeated until it is determined in step B6 that no other records remain in the specified file. Thus, in steps B3 through B6, unit 20 totals each record in the specified file in accordance with the totalization condition, and stores the totaled result in work memory 26. If NO is determined in step B6, unit 20 supplies the start command to update record generating unit 21 and print processing unit 23 in step B7, and returns to step B1.

If no file name code is set as shown in FIG. 3B, unit 20 supplies, in step B8, the start command to display processing unit 22. Upon receiving the start command from input processing unit 20, display processing unit 22 displays a display format and a cursor on a screen of display unit 30 to urge an operator to input data. An operator inputs, in step B9, word data from keyboard 11 in accordance with the input designation on the screen. Input processing unit 20 stores in step B10 word data input from keyboard 11 in work memory 26. Thereafter, unit 20 determines, in step B11, whether data input with respect to one record is completed or not. If the data input is not completed, unit 20 returns to step B9 to repeat similar processings.

If the data input is completed, unit 20 advances to step B7.

Update record generating unit 21 performs a processing as shown in a flowchart in FIG. 6.

Upon receiving a start command from input processing unit 20, update record generating unit 21 checks, in step C2, whether table C is loaded in file word memory 16. If no table C is loaded, unit 21 returns to step C1. On the contrary, if table C is found in file word memory 16, unit 21 reads, in step C3 a record stored in work memory 26, and generates, in step C4, an update record. Upon completion of generating the update record, unit 21 determines, in step C5, whether another table C is loaded in file word memory 16. If another table C is loaded in memory 16, unit 21 returns to step C4 to generate another update record. If no other table C is found in step C5, unit 21 determines in step C6 whether all the records in work memory 26 are read out. If the determination is affirmative, processing of unit 21 ends.

Figure 7:
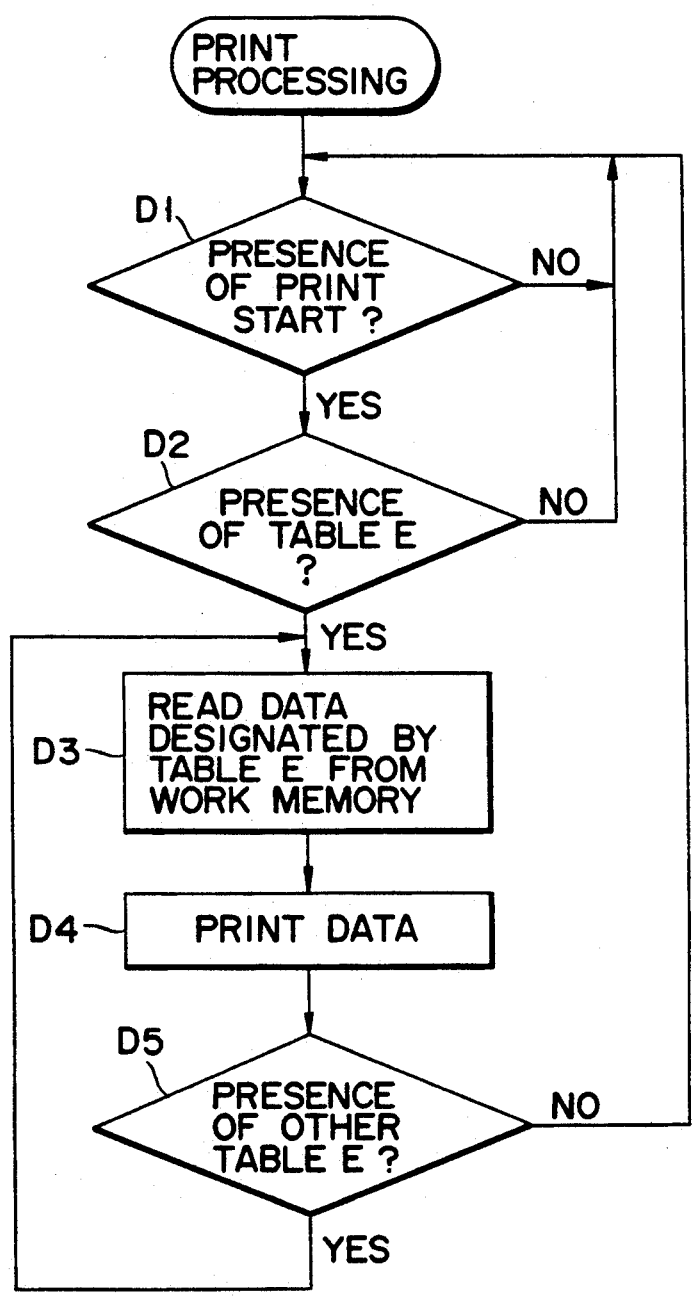
FIG. 7 is a flowchart showing a processing performed by unit 23.

Further, print processing unit 23 performs a print processing as shown in the flowchart of FIG. 7.

Print processing unit 23 checks, in step D1, the presence or absence of the start command from input processing unit 20. If the presence of the start command is determined, unit 23 advances to step D2 to check whether table E is loaded in print word memory 18. If table E is not loaded in memory 18, unit 23 returns to step D1.

On the contrary, if table E is loaded in memory 18, unit 23 reads from work memory 26, in step D3, word data corresponding to word labels set in table E, and prints, in step D4, the word data. Thereafter, in step D5, unit 23 determines whether another table E is loaded in print word memory 18. If another table E is found, unit 23 returns to step D3.

Similar operations are repeated and thus word data corresponding to the word labels defined by table E are printed. If no other table E is found, processing of unit 23 ends.

A specific example wherein data processing unit performs a slip processing task will now be described.

Note that the slip processing task is to input data by an operator in accordance with a preliminarily determined slip format, to issue a desired slip, and to update a predetermined file in master file 29 in accordance with the data input. As an example of the slip processing task, a sales slip transaction will now be described.

Figure 8A:
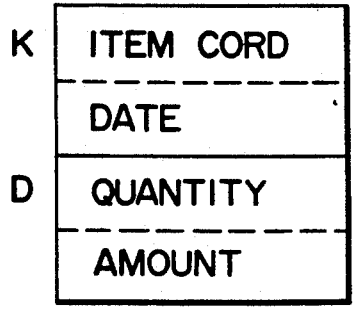
FIGS. 8A through 8C are views showing a word arrangement of a record in each file.
Figure 8B:
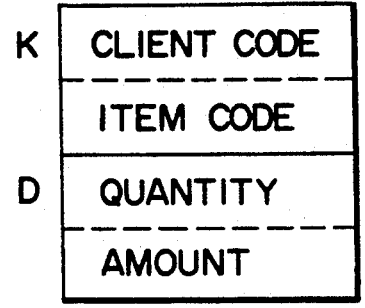

First, the data processing apparatus according to the present invention must be set to enable a transaction corresponding to a sales slip. More specifically, the PS indicating a sales slip processing task must be set. Further, tables A through E must be set to transact the sales slip. In this example, table A in FIG. 3B, tables C in FIGS. 4B and 4C, and tables D and E for defining the output format of the sales slip are required. The reason for the necessity of two tables C is that two files, i.e., a sales file and a client file must be updated with respect to a sales slip transaction. Two tables C shown in FIGS. 4B and 4C are set in accordance with word arrangements of a record in each file shown in FIGS. 8A and 8B. Tables C are set in accordance with the flowchart shown in FIG. 2. More specifically, tables C are set corresponding to PS number 1, for example.

An operator sets tables A through E by keyboard 11, releases the edit mode, and designates the PS number 1. Then, edit processing unit 12 reads tables A through E corresponding to the designated PS number 1 from PS file 13, loads tables A, C, D, and E in input word memory 14, file word memory 16, display word memory 17, and print word memory 18, respectively, and after the loading, supplies a start command to input processing unit 20. Then, input processing unit 20 starts to receive data from keyboard 11.

Figure 9:
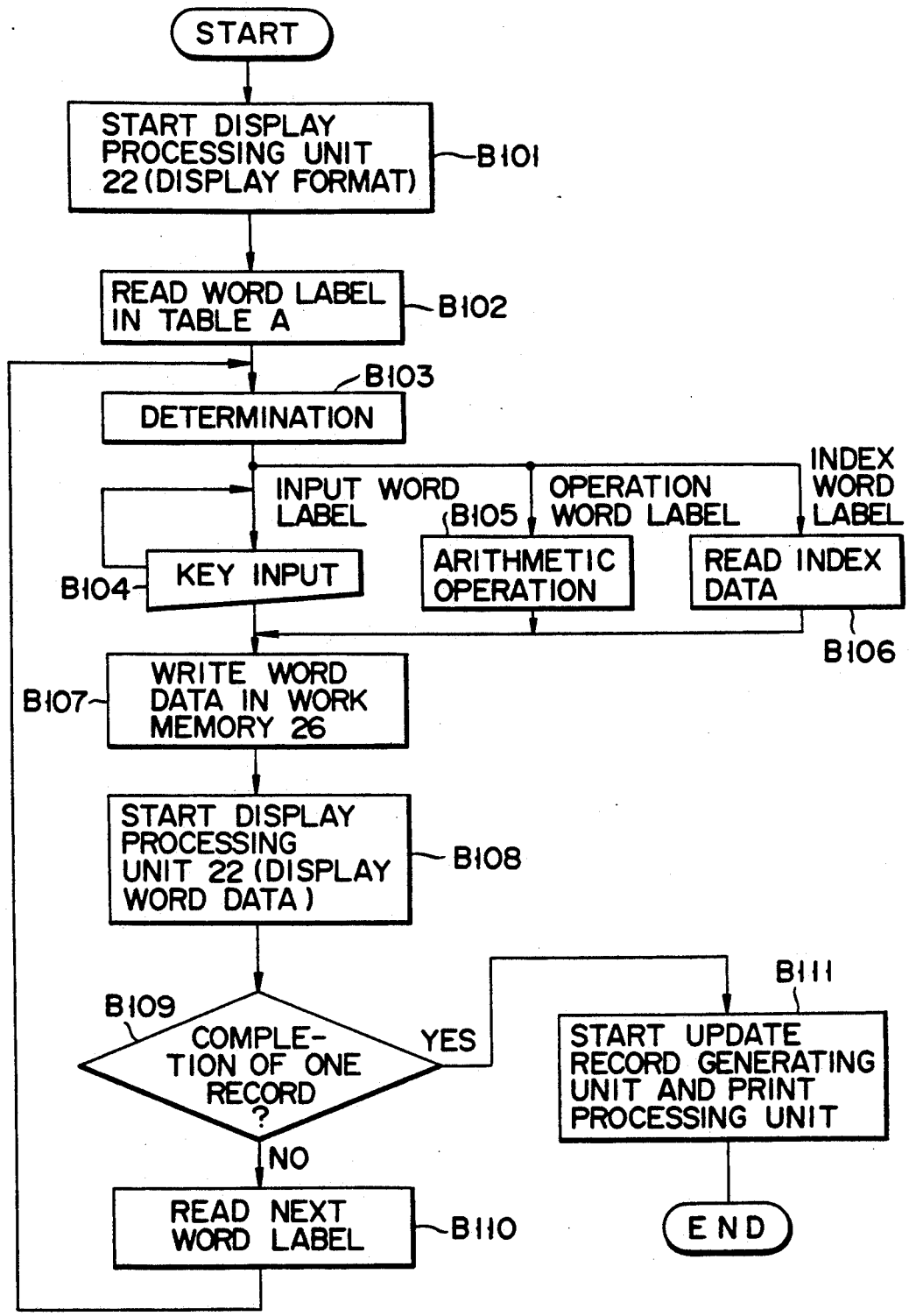
FIG. 9 is a flowchart showing a detail of FIG. 5.

The data input for a single slip is performed as shown in a flowchart of FIG. 9 by a control of input processing unit 20. The flowchart shown in FIG. 9 shows in detail processings of steps B8 through B11 and B7 in FIG. 5. Input processing unit 20 starts, in step B101, display processing unit 22 to generate a slip format shown in FIG. 10 in accordance with table D in display word memory 17, and to display the generated slip format on display unit 30. Input processing unit 20 reads in step B102 the word label of table A stored in input word memory 14, and determines in step B103 whether the word label is set as an input word label, an operation word label or an index word label. If the word label is set as the input word label, the operation word label, and the index word label, unit 20 advances to a key-input processing by keyboard 11 in step B104, an operation processing in step B105, and an index data reading processing in step B106, respectively. The first word label of above described table A represents "date", and is set as the index word label. Therefore, unit 20 advances to step B106 to retrieve index table memory 24, reads the preliminarily set current date data, for example "870907", stores, in step B107, it in work memory 26 as the word data corresponding to the word label of "date", and starts, in step B108 display processing unit 22. Display processing unit 22 reads from work memory 26 the word data designated by the word label of table D in display word memory 17, outputs the read-out word data to display unit 30, and displays it in the "date" column of the screen. Then, input processing unit 20 determines, in step B109, whether all the processings are completed or not by the depression of a completion key for completing an input of a single record. If the completion key is not depressed, unit 20 reads, in step B110, "slip number" of the next word label from input word memory 14 and returns to step B103 to discriminate the word label. Since the "slip number" is also set as the index word label, unit 20 executes the index data reading processing. More specifically, unit 20 reads the slip number data, e.g., "011" from index table memory 24, stores it in work memory 26 as the word data corresponding to the word label of the "slip number", and then displays it in the "slip number" column on display unit 30 through display processing unit 22. Thereafter, unit 20 reads "client code" of the next word label from input word memory 14, and analyzes the word label. Since the "client code" is set as the input word label, unit 20 advances to the key input processing in step B104. In this key input processing, unit 20 displays a cursor on item corresponding to the word label, in the display format displayed by display unit 30. More specifically, unit 20 urges an operator to input a word data of "client code". When an operator inputs "50", for example as the client code, unit 20 stores the word data "50" as the word data corresponding to the word label of the "client code" in work memory 26 and displays it in a column of "a client code" on display unit 30.

Similar key input processings are performed with respect to "item code", "quantity", "unit price", and the like read out from input word memory 14. When the word label of "amount" is read out from input word memory 14, an arithmetic operation in step B105 is executed. In this operation, an arithmetic operation of "quantity x unit price" is executed based on the word data corresponding to the word label of "quantity" and the word data corresponding to the word label of "unit price". The operation result is stored in work memory 26 as the word data corresponding to the word label "amount", and also displayed in a column of "amount" on display unit 30.

FIG. 11 shows a content of work memory 26 after data amount to one record are input. Work memory 26 stores a plurality of pairs each comprising a word label and a word data corresponding to the word label. After a word processing with respect to one record is completed as described above, unit 20 advances from step B109 to step B111 to start update record generating unit 21 as well as print processing unit 23.

Figure 12:
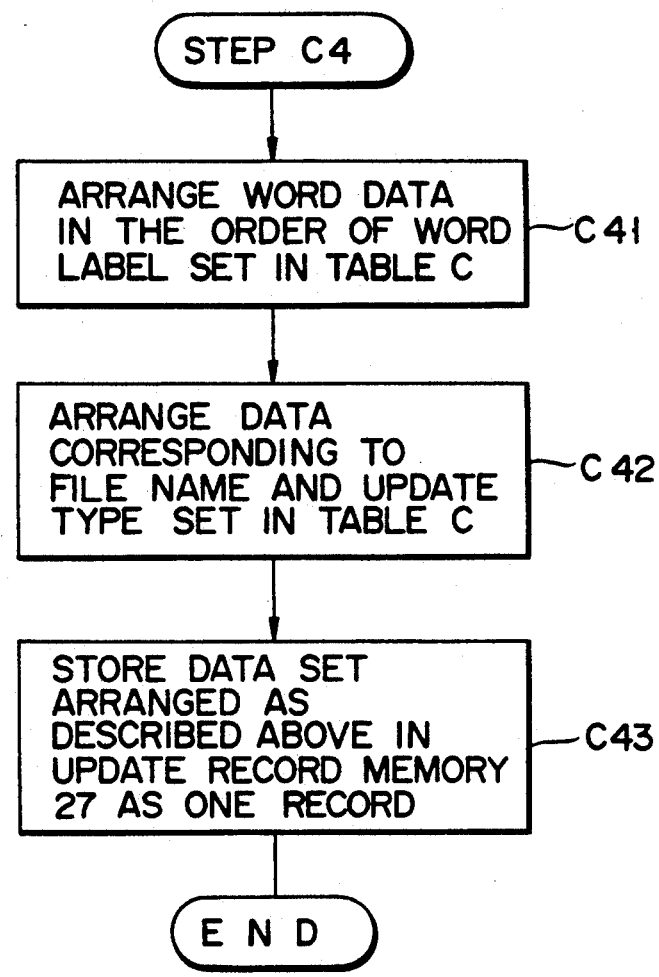
FIG. 12 is a flowchart showing a detail of FIG. 6.

In response to a start command from input processing unit 20, update record generating unit 21 executes a processing in accordance with a flowchart shown in FIG. 6. In step C2, unit 21 determines whether table C is set in file word memory 16 or not. In this case, table C shown in FIG. 4B is set in memory 16. Therefore, unit 21 advances to step C3 to read a record stored in work memory 26, and generates in step C4 an update record in accordance with table C shown in FIG. 4B. The details of step C4 are shown in FIG. 12. More specifically, unit 21 extracts in step C41 the word data corresponding to "item code", "date", "quantity", and "amount" from the words constituting a record read out from work memory 26, and arranges the word data in the order of the word labels set in table C. Then, unit 21 arranges in step C42 "file name code" and "file update type code" set in table C. Unit 21 stores, in step C43, the data thus arranged in update record memory 27, as one update record.

After generating the update record in step C4, unit 21 determines, in step C5, if another table C is stored in file word memory 16. In this case, memory 16 stores table C shown in FIG. 4C besides table C shown in FIG. 4B. Therefore, unit 21 returns to step C4 to generate another update record in accordance with table C shown in FIG. 4C and stores it in update record memory 27.

Figure 13:
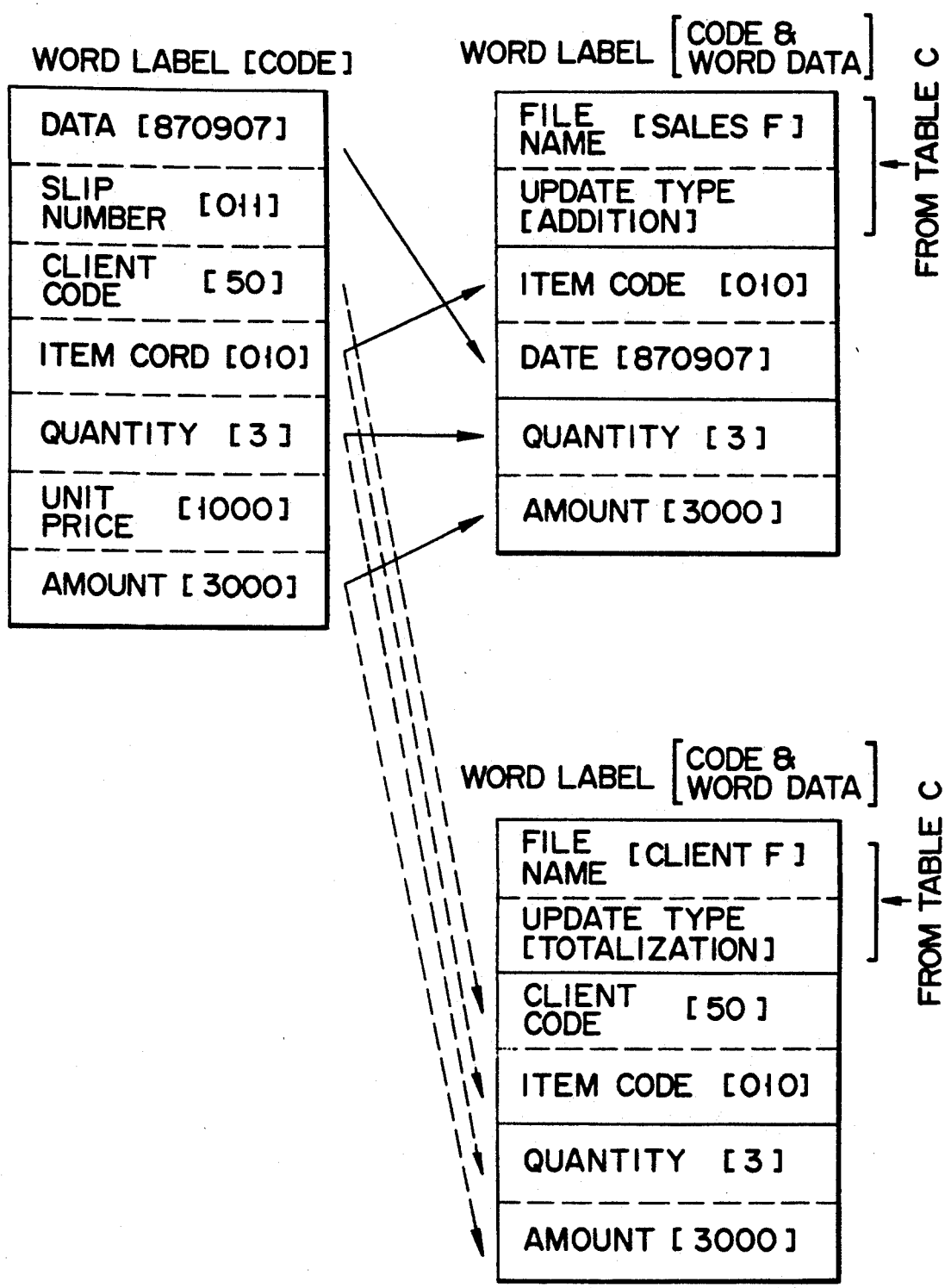
FIG. 13 is a view showing a correspondence between a single input record and two update records.

FIG. 13 is a diagram explaining how to generate two update records in accordance with two tables C shown in FIGS. 4B and 4C. More specifically, FIG. 13 shows a correspondence between the respective words constituting an update record and the respective words constituting a record stored in work memory 26.

After completing all the tables C stored in file word memory 16, unit 21 advances from step C5 to step C6 to determine whether or not all the records store in work memory 26 are processed. In this case, since work memory 26 stores a single record, YES is determined and unit 21 thus completes the update record generating processing. If unit 21 determines other records stored in work memory 26 in step C5, it reads in step C7 the other records and repeats processings shown in steps C4 and C5 with respect to the read-out record.

As described above, records to be stored in work memory 26 are transformed into update records through update record generating unit 21, and then sequentially stored in update record memory 27. The update records stored in update record memory 27 are sequentially read in file update unit 28 in accordance with an update command from keyboard 11. Then, update unit 28 updates files stored in master file 29. More specifically, file update unit 28 performs a processing according to a flowchart shown in FIG. 14 in response to an update command, reads in step E1 an update record stored in update record memory 27, and selects in step E2 a corresponding file in master file 29 and the update type, in accordance with the "file name code" and "file update type code" included in the update record. Further, unit 28 updates, in step E3, a selected file based on the selected update type by using a record constituted by keywords S(K) and update words (D) included in the update record. The processings in steps E1 through E4 are applied to each update record stored in update record memory 27.

Figure 15:
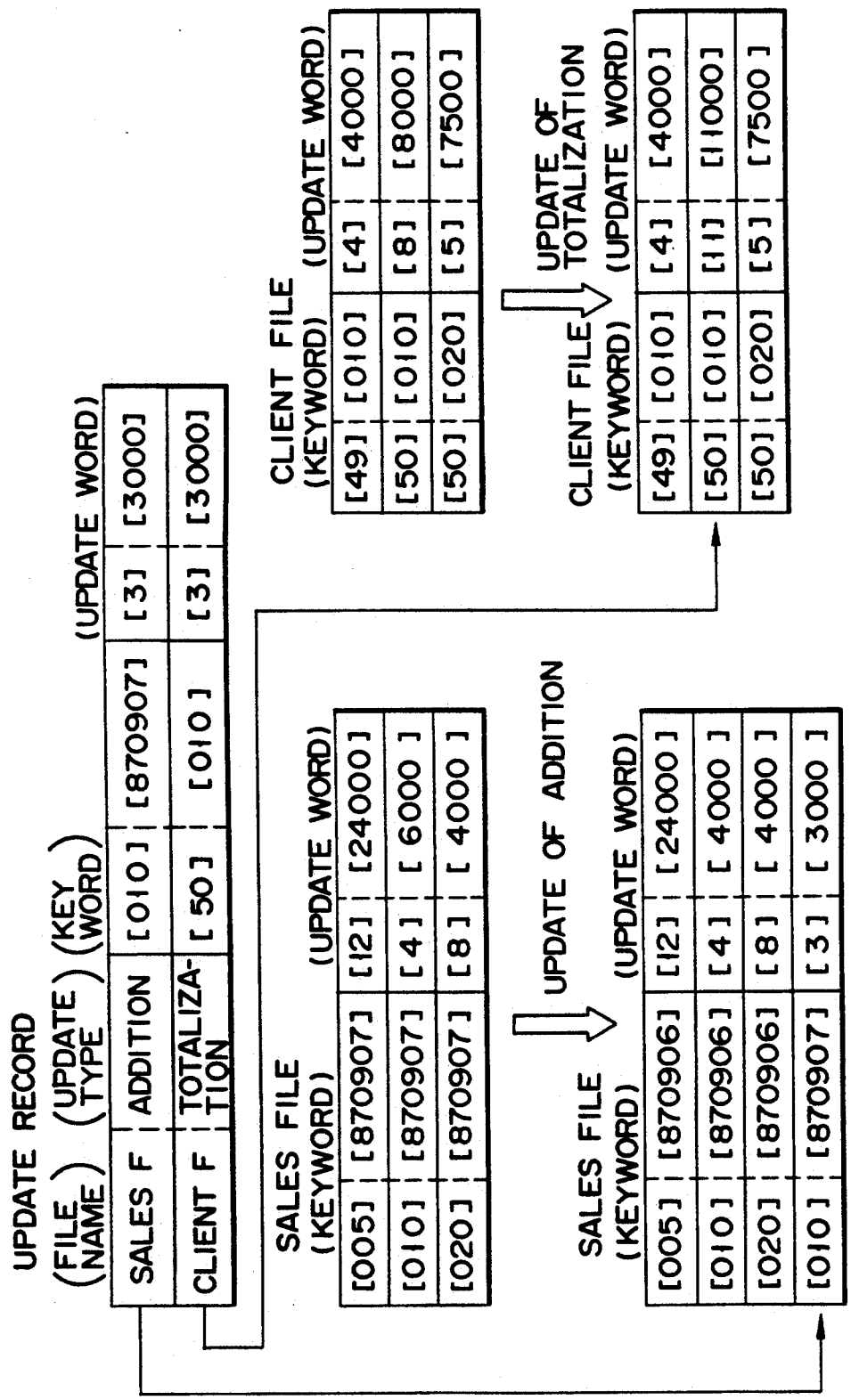
FIG. 15 is a view for explaining a file-update status.

FIG. 15 is a transition diagram wherein the files designated by the update records, i.e., the sales file and the client file are updated in accordance with the two update records stored in update record memory 27.

A specific example of a totalization processing task performed by a data processing apparatus according to the present invention will now be described. Note that the totalization processing task is to update other total file in accordance with each record in a file such as the sales file which is updated by a daily slip transaction task.

A sales totalization transaction will now be described as an example of a totalization transaction.

Figure 8C:
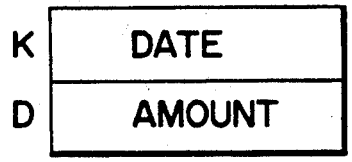

First, the data processing apparatus according to the present invention must be set to enable a sales totalization. More specifically, the PS indicating the sales totalization processing task must be set, and the corresponding tables A and C must be set. In this example, table A shown in FIG. 3C and table C shown in FIG. 4D are required. Table C shown in FIG. 4D is set in accordance with a word arrangement of a record in the total file. FIG. 8C shows a word arrangement of a record in the total file. Tables A and C are set in accordance with the flowchart shown in FIG. 2, and are set corresponding to PS number 2, for example.

An operator sets tables A and C to the PS file 13 by keyboard 11, releases the edit mode, and designates the PS number 2. Then, edit processing unit 12 reads tables A and C corresponding to PS number 2 from PS file 13, in accordance with the designated PS number, loads tables A and C in input word memory 14 and file word memory 16, respectively, and supplies a start command to input processing unit 20. In response to the start command, input processing unit 20 starts a processing in accordance with table A stored in input word memory 14. FIG. 16 shows in detail steps B3 through B6 in FIG. 5. Input processing unit 20 determines, in step B201, whether the totalization condition is set in table A. If the totalization condition is not set, unit 20 advances to step B202 to read a record stored in a file corresponding to a file name code, e.g. "sales file", set in table A. Unit 20 reads from the record, in step B203, word data corresponding to word labels set in table A, and generates an intermediate record in which the word data are arranged in the order of the word labels set in table A. Then, unit 20 stores, in step B204, the intermediate record in work memory 26. In step B205, unit 20 determines whether all the records have been read out from the "sales file". If a record which has not been read out remains in the file, unit 20 reads, in step B206, the record from the file, and returns to step B203 to generate the intermediate record. Processings in steps B203 through B206 are repeated until all the records have been read out from the file. When unit 20 completes the reading operation of all the records from the file, it advances to step B7 in FIG. 5.

In the embodiment of the present invention, a totalization condition is set in table A stored in input word memory 14, as shown in FIG. 3C. Therefore, unit 20 advances from step B201 to B207. As the totalization condition, the upper seven digits of keywords are set in table A. Therefore, unit 20 extracts, in step B207, the upper seven digits of the keywords of the record stored in the file corresponding to a file name set in table A, i.e., "sales file", and sets the seven digits as a new keyboard data. In step B208, unit 20 selects, from the file, all records whose upper seven digits of the keywords coincide with those of the new keyword data, and totals, in step B209, the update word data of each of the selected records. Unit 20 generates, in step B210, a totaled record which has the new keyword data and the totaled update word data. Thus, unit 20 stores the totaled record in work memory 26 in step B211. In step B212, unit 20 determines whether any record which has not been selected yet remains in the file. If the non-selected record remains in the file, unit 20 extracts, in step B213, the upper seven digits of the keywords of the record and sets the upper seven digits as a new keyboard data. Then, unit 20 repeats steps B208 through B211 to generate the totaled record in which the respective words in each selected record having the same upper seven digits are totaled, and stores it in work memory 26. Then, unit 20 totals the records by the keyword serving as the totalization condition set in table A, in accordance with a similar operation. When unit 20 completes all the record totalization based on all the totalization conditions, unit 20 advances to step B7 in FIG. 5.

FIG. 17 shows a transition diagram in which records stored in the sales file and having the same upper seven digits of the keyword are totaled and stored in work memory 26 by the operation of input processing unit 20 as described above. In response to a start command supplied from input processing unit 20, update record generating unit 21 operates in accordance with table C as shown in the flowchart shown of FIG. 6. More specifically, table C shown in FIG. 4D is stored in file word memory 16. Therefore, each record stored in work memory 26 is transformed into respective update records and then stored in update record memory 27.

As described above, a plurality of update records are stored in update record memory 27. In response to a file update command from keyboard 11, these update records are sequentially read in the file update unit 28 in accordance with the flowchart in FIG. 14. Thus, a file corresponding to the file name code stored in update record memory (in this case, the total file) is updated.

What is claimed is:

1. An apparatus for processing word data, comprising:

input word storing means for storing an input word table including a first set of word labels;

file word storing means for storing a plurality of file word tables, each file word table including a file name and a second set of word labels;

display word storing means for storing a display word table including a third set of word labels and a display output format;

print word storing means for storing a print word table including a fourth set of word labels and a print output format;

input processing means for inputting a plurality of input word data assigned to the first set of word labels included in the input word table, and for generating input records based on said input word table, each input record including a respective one of the input word data, said input word data being inputted by an operator;

first data storing means for storing the generated input records;

generating means for designating an input record stored in said first data storing means, for reading out from the designated input record a plurality of word data assigned to the second set of word labels included in one of the file word tables stored in said file word storing means to produce first read out respective word data, for generating an update record including the read out respective word data and the same file name included in one of the file word tables, and for performing said reading out and said generating for every file word table stored in said file word storing means;

second data storing means for storing respective ones of the update records generated for every file word table stored in said file word storing means;

file update means for reading out, in response to a file update instruction, one of the update records stored in said second data storing means, for updating the file corresponding to the file name included in the update record by the respective word data included in the update record, and for performing said reading out and said updating for every update record stored in said second data storing means;

display processing means for reading a plurality of word data assigned to the third set of word labels included in the display word table for every input record stored in said first data storing means to produce second read out respective word data, and for displaying on a display screen the second read out respective word data with the display output format included in said display word table; and print processing means for reading out a plurality of word data assigned to the fourth set of word labels included in the print word table for every input record stored in said first data storing means to produce third respective read out word data, and for printing the third read out respective word data with said print output format included in the print word table.

2. An apparatus for processing word data, comprising:

a plurality of files;

input word storing means for storing an input word table including a first file name corresponding to one of the files and a first set of word labels;

file word storing means for storing a file word table including a second file name corresponding to one of the files and a second set of word labels;

input processing means for designating a file corresponding to the first file name included in the input word table to produce a designated file, for reading out a record stored in the designated file to produce a read out record, for reading out a plurality of operator-inputted word data assigned to the first set of word labels from predetermined word data included in the read out record, for generating input records based on said input word table, each input record including the read out plurality of word data assigned to the first set of word labels, and for performing said reading out and said generating for every record stored in the designated file;

first data storing means for storing the input records generated by said input processing means;

generating means for designating one of the input records stored in said first data storing means to produce a designated input record, for reading out from the designated input record a plurality of word data assigned to the second set of word labels to produce read out respective word data, for generating an update record including the read out respective word data and the same second file name set in the file word table, and for performing said reading out and said generating every input record stored in said first data storing means;

second data storing means for storing respective ones of the update records generated by said generating means; and file update means for reading out, in response to a file update instruction, one of the update records stored in said second data storing means, for updating, in accordance with respective word data included in the update record which has been read out, the file assigned to the second file name included in said update record, and for performing said reading out and said updating for every update record stored in said second data storing means.

3. The apparatus according to claim 2, further comprising:

first setting means for arbitrarily setting, in said input word storing means and by an operator, the input word table including an arbitrary first set of word labels and an arbitrary first file name; and second setting means for arbitrarily setting, in said file word storing means and by an operator, the file word table including an arbitrary second set of word labels and an arbitrary second file name.

4. The apparatus according to claim 2, wherein:

said file word storing means stores a plurality of sets of file word tables; and said generating means includes means for generating a plurality of update records corresponding to respective ones of the file word tables stored in said file word storing means, from one of the input records stored in said first data storing means.

5. The apparatus according to claim 2, further comprising:

print word storing means for storing a plurality of types of print word tables, each table including a third set of word labels having a plurality of word data assigned thereto, and an output format; and print processing means for reading out the plurality of word data assigned to the third set of word labels included in one of the print word tables stored in said print word storing means for every input record stored in said first data storing means to produce read out respective word data, for printing the read out respective word data in accordance with the output format set in the print word table, and for performing said reading out and said printing for every print word table stored in said print word storing means.

6. An apparatus for processing data in accordance with input data, comprising:

a table file for storing a plurality of sets of tables, each set of table comprising an input word table including a first set of word labels, a file word table including a file name and a second set of word labels including a plurality of word data assigned thereto, and an output word table including a third set of word labels and an output format;

designating means for designating a set among the plurality of sets of tables by an operator;

selecting means for selecting, from the table file, the input word table, the file word table, and the output word table included in the set designated by said designating means to produce a selected input word table, file word table, and output word table;

input processing means for inputting, by means of an operator, a plurality of input word data assigned to the first set of word labels included in said input word table, and for generating input records based on said input word table, said input records including the plurality of input word data;

first data storing means for storing the generated input records;

a plurality of files;

file processing means for designating one said file corresponding to the file name included in the selected file word table, for reading out a plurality of word data assigned to the second set of word labels included in the selected file word table for every input record stored in said first data storing means, and for updating the designated file by respective ones of the word data which have been read out; and output processing means for reading out a plurality of word data assigned to the third set of word labels for every input record stored in said first data storing means, and for outputting respective ones of the word data which have been read out in accordance with the output format included in the selected output word table.

7. A method for processing a plurality of word data in a computer, comprising:

designating an input word table including a first set of word labels, a file word table including a file name and a second set of word labels having word data assigned thereto, and a print word table including a third set of word labels and a print output format;

inputting, by an operator, in response to an input start instruction, a plurality of input word data assigned to the first set of word labels, and generating input records based on said input word table, each input record including the plurality of input word data;

storing the generated input records in a first data storing means;

designating, in response to a file-process start instruction, one of the input records stored in said first data storing means to produce a designated input record, reading out from the designated input record a plurality of word data assigned to the second set of word labels of the file word table, generating an update record including the plurality of word data which have been read out and the same file name included in the file word table, and performing said reading out and said generating for every input record stored in said first data storing means;

storing a respective one of the update records which have been generated in a second data storing means;

providing a plurality of files;

reading out, in response to a file update start instruction, the update record stored in the second data storing means, updating one of said files corresponding to the file name included in the update record in accordance with respective ones of the word data included in the update record, and performing said reading out and said updating for every update record stored in said second storing means; and reading out, in response to a print output instruction, a plurality of word data assigned to a respective one of said third set of word labels for every input record stored in said first data storing means and printing respective word data which has been read out in accordance with the print output format included in the print word table.

* * * * *